US008645259B1

(12) United States Patent
Draganov et al.

(10) Patent No.: US 8,645,259 B1
(45) Date of Patent: Feb. 4, 2014

(54) MITIGATING RISK ASSOCIATED WITH EXECUTING LIMIT ORDERS FOR TRADING SECURITIES

(75) Inventors: Alexandr Borisovich Draganov, Reston, VA (US); Franklin Milton Haas, Jr., Hamilton, VA (US)

(73) Assignee: Tyche Technologies LLC, Reston, VA (US)

( * ) Notice: Subject to any disclaimer, the term of this patent is extended or adjusted under 35 U.S.C. 154(b) by 693 days.

(21) Appl. No.: 12/030,869

(22) Filed: Feb. 14, 2008

(51) Int. Cl.
*G06Q 40/00* (2012.01)

(52) U.S. Cl.
USPC .............................................. 705/37; 705/38

(58) Field of Classification Search
USPC .......................................................... 705/37
See application file for complete search history.

(56) References Cited

U.S. PATENT DOCUMENTS

| | | | |
|---|---|---|---|
| 6,493,682 B1 | 12/2002 | Horrigan | |
| 6,829,589 B1 | 12/2004 | Saliba | |
| 6,968,326 B2 | 11/2005 | Johnson | |
| 7,020,630 B2 | 3/2006 | Russell | |
| 7,110,974 B1 | 9/2006 | Rust | |
| 7,162,447 B1 | 1/2007 | Cushing | |
| 7,287,006 B1 | 10/2007 | Kratka | |
| 7,299,208 B1 | 11/2007 | Bailon | |
| 7,881,995 B2 * | 2/2011 | Grimberg | 705/35 |
| 7,904,371 B2 * | 3/2011 | Davidowitz et al. | 705/37 |
| 8,027,900 B1 * | 9/2011 | Chaffee | 705/37 |
| 2002/0010672 A1 * | 1/2002 | Waelbroeck et al. | 705/37 |
| 2002/0147670 A1 * | 10/2002 | Lange | 705/35 |
| 2004/0177024 A1 * | 9/2004 | Bok et al. | 705/37 |
| 2006/0036531 A1 * | 2/2006 | Jackson et al. | 705/37 |
| 2008/0077521 A1 * | 3/2008 | Sibley et al. | 705/37 |

OTHER PUBLICATIONS

Kenney Colleen; The Analysis of Limit Orders Using the Cox Proportional Hazards Model with Independent Competing Risks; Nov. 2007.*
Tanaka Tajahiro, Jati Daiki; Execution Probability Calculation System, and Execution Probability Calculation Program for Limit Order; Jan. 4, 2005; JPO & Japio 17/3,K/14 (Item 14 from file: 347).*
Thomson Reuters; Emulation of empty database tables using database views; 2007; 7/AA,AN,AZ,AU,TI/1 (Item 1 from file: 350).*
Thomson Reuters; System and method for an optimistic database access; 2004; 7/AA,AN,AZ,AU,TI/2; (Item 2 from file: 350).*

* cited by examiner

*Primary Examiner* — Ella Colbert
*Assistant Examiner* — Michael Cranford
(74) *Attorney, Agent, or Firm* — Leo B. Kriksunov

(57) ABSTRACT

Current market price, limit price, and short term volatility define the probability that the market price will reach the desired limit price and that the order will be executed. A computer implemented method estimates the probability of executing the limit price order and provides output to the investor to assist in setting the limit price in an informed way. According to an embodiment of the present invention, a computer implemented system provides the investor with prices predicted to be executable at a set of given probabilities of execution. In one embodiment, the output to the investor includes a set of limit order execution probabilities, such as 80%, 90%, 95%, or similar, and corresponding limit order set prices. In another embodiment, an investor sets the execution probability, such as 95%, which is provided as input into the system. The output to the investor includes the calculated limit price corresponding to the set execution probability.

36 Claims, 10 Drawing Sheets

MITIGATING RISK ASSOCIATED WITH EXECUTING LIMIT ORDERS FOR TRADING SECURITIES

FIELD OF THE INVENTION

The present invention relates to the field of securities trading and, in particular, to a method of optimizing prices on selling and buying securities, such as stocks. More specifically, the present invention relates to mitigating risk associated with executing limit orders, subject to uncertain execution, and to optimizing execution prices.

BACKGROUND OF THE INVENTION

Trading securities, such as currencies, commodities, or stocks using, for example, an online brokerage, involves providing security-specific information, such as in the case of stocks, the ticker symbol, number of shares to trade, and the order type. The order type determines the way the trade is executed. If the order type is set to market, the trade is executed at the first opportunity at the currently available price. However, many investors set the order type to limit. In this case, the trade is executed when and only when the price of the stock reaches a value specified by the investor. For example, at the time of the order placement, the price per share for the stock in question is $32. If an investor wants to sell some shares, she may set the limit price to $32.50, and may specify the time for execution "till end of day". The sale takes place only if the stock price reaches $32.50 or more anytime during the remainder of the trading day. If the stock price remains below the limit, the order is automatically canceled at the end of the day. Similar rules apply to buy orders. Thus an investor choosing to place a purchase limit order may not receive execution if the price rises, but will receive execution if the price falls sufficiently. The investor misses some of the gains and suffers more of the losses. Optimally placed limit orders may provide superior returns by reducing the costs of execution. Limit order trading involves the risk of non-execution but also offers the promise of superior returns.

Limit price orders have obvious advantages of yielding better prices and protecting investors from undesirable effects of volatility in the market price. However, this advantage comes at a cost of losing some control over the order, as the order may never execute. The investor must balance her desire to obtain a better price with a need to ensure reasonable chances of executing the order. Some securities are more volatile, and there is more chance that the share price will deviate from the current market price to reach the limit set by the investor. Other securities are less volatile, and the limit price must be set closer to the current market price if the investor wants the trade to be executed within a specified timeframe (e.g., by the end of the day or within a week).

Thus, there is a need to provide investors with a means to optimize prices on selling and buying securities and specifically a method to estimate the probability of executing limit orders, and to assist with making informed decisions on balancing the associated risk and return.

BRIEF DESCRIPTION

In one embodiment, this invention comprises a computer-implemented system (with at least one processor, display, and user interface) that houses an algorithm, and software to provide a user with actionable estimates of limit trade risks. The computer system uses the Internet or a local database to access the recent price history of stocks and other securities.

In one embodiment of the present invention, when an investor sets the price limit and the time limit for an order, the algorithm uses the recent price history for the stock to estimate the short term volatility of the stock price. Even though exact price movements of the stock cannot be predicted, the statistical features of these movements, such as volatility, are often quite stable, and one may use the recent history to estimate the likely value of these features in the nearest future, e.g. during the time limit set for the trade. The current market price, the limit price, and the short term volatility define the probability that the market price will reach the desired limit price and that the order will be executed. The algorithm estimates this probability and provides output to the investor to assist in setting the limit price in an informed way.

In other embodiments of the present invention, the algorithm provides the investor with prices predicted to be executable at a set of given probabilities of execution. In one embodiment, the output to the investor includes a set of limit order execution probabilities, such as 80%, 90%, 95%, or similar, and corresponding limit order set prices. In another embodiment, an investor sets the execution probability, such as 95%, which is provided as input into the algorithm. The output to the investor includes the calculated limit price corresponding to the set execution probability.

The present invention is described with an example of a sell order; the case of a buy order is completely analogous.

DETAILED DESCRIPTION

Figure 1:
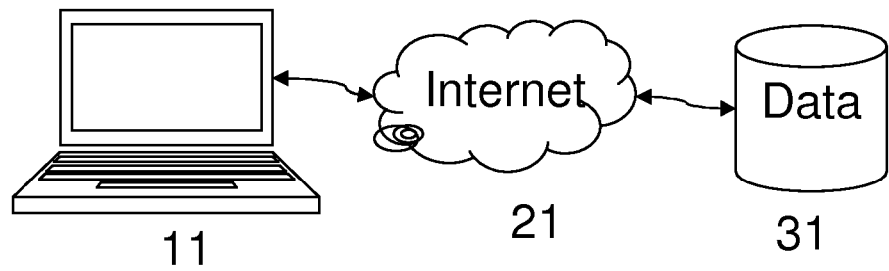
FIG. 1 represents a schematic diagram of an embodiment of the present invention.

Normal Distribution from Short Time Interval, e.g. 1-Minute, Variance

In one embodiment of the present invention, the method to compute the probability of executing a limit order is based on the approximation of random-walk, Brownian motion movement of the stock price. Let us denote the current market price of the stock by $x_m$, and the desired limit price by $x_l$. The difference between these two prices is denoted by $\Delta x = x_m - x_l$. We assume that the standard deviation of a stock price's movement over some short time period $\Delta t$ (e.g., 1 minute) is known, e.g. by analyzing the recent price history. We denote this standard deviation with $\sigma_s$. For the purposes of discussion, this quantity will be referred to as 1-minute standard deviation, even though the actual interval is not constrained to be 1 minute long. The short time interval, exemplified by 1 minute interval, can also be a 10 seconds interval, 30 seconds interval, 1 minute interval, 2 minutes interval, 10 minutes interval, 20 minutes interval, or similar. Intervals longer than 20 minutes or shorter than 10 seconds are also contemplated.

We model the stock price as a random walk, i.e. assume that previous price changes do not have any bearing on future price changes. In this case, at the time t the standard deviation of the stock price can be computed as follows:

$$\sigma(t) = \left(\frac{t}{\Delta t}\right)^{\frac{1}{2}} \cdot \sigma_s \tag{1}$$

Moreover, the statistics of the stock price at time t can be modeled as normal (Gaussian) if $t \gg \Delta t$.

Our goal is to estimate the probability that the trade executes (or conversely that it does not execute) during time t. This goal can be accomplished if we consider all possible trajectories of the stock price, which start at price $x_m$, and have duration t. Some of these trajectories will have the stock price intersect the limit price $x_l$ at some point during time interval t; they correspond to cases when the stock will be sold during this time. Other trajectories never reach the price limit, and therefore correspond to cases when the stock is not sold during time t. Let us consider only latter trajectories, i.e. those which do not reach the limit price. We will say that these trajectories belong to a set S. We now proceed to compute the probability density function $F_{ne}(x,t)$ for the stock price x at some time t for such trajectories only, where subscript ne refers to "not executed". It can be computed if we recognize the following considerations:

At time 0, the price is equal to the known market price, and therefore the probability density function is the Dirac delta function $F_{ne}(x, t=0) = \delta(x - x_m)$ By definition, the trajectories at hand do not cross the limit price. Thus, probability of reaching or exceeding the limit price must be zero: if $x \geq x_l$ then $F_{ne}(x,t) = 0$ Over a small incremental time interval, stock price is subject to variation with some small standard deviation $\sigma_s$.

The latter consideration readily yields to a parabolic partial differential equation for the probability density function:

$$\frac{\partial F_{ne}(x, t)}{\partial t} = \frac{\sigma_s^2}{2\Delta t} \cdot \frac{\partial^2 F_{ne}(x, t)}{\partial x^2} \tag{2}$$

This is the same equation as in the theory of heat transfer. The first consideration above is the initial condition, and the second one is the boundary condition for solving this equation. In fact, the problem is completely analogous to a heat transfer problem for a half space with a heat sink at $x = x_m$. For a heat transfer problem, the heat sink removes the energy from the medium, whereas for the stock trading problem, the "sink" removes a trajectory from set S (i.e., the stock is traded as soon as it reaches the limit price and therefore is no longer in the set S).

One can show that the solution of the parabolic equation with these initial and boundary conditions is as follows:

$$F(x, t) = \begin{cases} \frac{1}{\sqrt{2\pi} \cdot \sigma(t)} \cdot \exp\left[-\frac{(x - x_m)^2}{2\sigma^2(t)}\right] - \\ \frac{1}{\sqrt{2\pi} \cdot \sigma(t)} \cdot \exp\left[-\frac{(2x_l - x_m - x)^2}{2\sigma^2(t)}\right], & \text{if } x < x_l \\ 0 & \text{if } x \geq x_l \end{cases} \tag{3}$$

where $\sigma(t)$ is defined by equation (1).

We recognize that the distribution function in the form of equation (3) has a structure that is valid for non-normal distributions as well. Let us assume that there is an original distribution $F(x, t=0)$ that has non-zero values for $x \leq x_l$ only. We assume that stock price is affected by multiple successive infinitesimally small random changes, which have zero mean (i.e., no trend or trend is not significant). The distribution function transforms over time to some other function $F(x,t)$, where $t \neq 0$. This distribution function no longer is confined to the $x \leq x_l$ region. We assume that there is a sink at $x = x_l$. Then we can compute the distribution function of the stock prices under the condition that the order was not executed as follows:

$$F_{ne}(x, t) = \begin{cases} F(x, t) - F(2x_l - x, t) & \text{if } x < x_l \\ 0, & \text{if } x \geq x_l \end{cases} \tag{4}$$

Equation (4) will be used below for several computations.

At time 0, equation (3) degenerates into the delta function, which when integrated over price produces 1. Thus, at time 0 the probability that a trajectory belongs to set S is equal to 1. However, as time progresses, the integral of the solution gradually decreases. The reason for this is the "sink" at $x=x_l$, which continues to remove trajectories from set S. Our goal is to compute the magnitude of this decrease. It can be done by computing the cumulative effect of the "sink" (i.e., integrating flux across boundary $x=x_l$), or by simply computing the integral of the solution for the probability distribution function over price. These two computation methods produce equivalent results, as proved by the continuity equation. We opt for the second method, which yields:

$$P_{ne}(t) = \int_{-\infty}^{\infty} P(x, t) \cdot dx = 1 - 2\int_{P_m}^{\infty} \frac{1}{\sqrt{2\pi} \cdot \sigma(t)} \cdot \exp\left[-\frac{(x - x_m)^2}{2\sigma^2(t)}\right] \cdot dx \tag{5}$$

The result of this computation is the probability that a trajectory remains in set S during time t, i.e., that the sell order is not executed (hence subscript notation ne). The probability that the order is executed is given by $$P_e(t) = 1 - P_{ne}(t) = 2\int_{x_l}^{\infty} \frac{1}{\sqrt{2\pi} \cdot \sigma(t)} \cdot \exp\left[-\frac{(x - x_m)^2}{2\sigma^2(t)}\right] \cdot dx \tag{6}$$

The integral in (6) is readily expressed via the error function:

$$P_e(t) = \text{erfc}\left(\frac{(x_l - x_m) \cdot \sqrt{\Delta t}}{\sqrt{2t} \cdot \sigma_s}\right) \quad (7)$$

where we also substituted σ(t) from equation (1) to arrive at the final result. Equation 7 provides the mathematical expression of the probability that the limit order is executed at the set price and within set period of time.

Corrections to the Normal Distribution

In one embodiment of the present invention, the method described above, is further refined to improve accuracy. The sources of inaccuracies in the distribution and improvements to the method are provided below.

Correlations Between Short Time Interval, e.g. 1-Minute, Variances

Data analysis shows that short time interval, e.g. 1-minute, price changes in the stock price are not uncorrelated. The correlation between changes in the stock price rapidly decreases with the increase of time separation. One can account for this effect by applying a correction to the short time interval, e.g. 1-minute variance, typically lowering its value. The value of such correction can be estimated from the data and is selected to provide a good estimate of the variance of the price over the time of the limit order.

The following procedure may be used to correct for correlations between 1-minute variances: Instead of using equation (1) in the above formulation, we use:

$$\sigma(t) = \left(\frac{t}{\Delta t}\right)^{\frac{1}{2}} \cdot (\sigma_s + 2\varsigma) \quad (8)$$

where $\varsigma$ is the covariance of successive movements of the stock price. Equation (7) now becomes:

$$P_e(t) = \text{erfc}\left(\frac{(x_l - x_m) \cdot \sqrt{\Delta t}}{\sqrt{2t} \cdot (\sigma_s + 2\varsigma)}\right) \quad (9)$$

Tails of the Distribution

In practice, short time interval, e.g. 1-minute, price changes do not have a normal distribution. The price change over the time of the limit order comprises many successive 1-minute price variations; therefore it approaches the normal distribution. However, the assumption of the normal distribution may not be accurate enough even for the price change over the time of the limit order. Deviations from the normal distribution primarily affect its tails, which in practice are often "fatter" than those predicted by the normal distribution. One way to account for this effect is to analyze historical data and estimate corrections to the limit order probabilities from the data.

There is another more important source of "fat tails". In addition to predictable (e.g., scheduled) events which affect stock price variability, there are unpredictable external events. For example, a newspaper article is published that presents some adverse information about the company, etc. Data shows that large daily variations in the stock price occur substantially more often than those which are predicted by a distribution function derived from short time interval, e.g. 1-minute, variance (we assume here that the value of 1-minute variance is derived from long-term price behavior). Since this effect cannot be modeled using normal distributions, the model must be modified to account for it.

According to one embodiment of the present invention, the "fat tails" of the distribution are properly accounted for by heuristically using a sum of several (two or more) normal distributions. The normal distribution function is characterized by its variance. From a long series of historical data one estimates the average variance only. There may be future events that affect the variance in the short term, for the period of the limit order. The net effect of such events can be a decrease or an increase in the variance.

Thus, instead of a single normal distribution with some variance, we devise a model of a sum of two or more normal distributions, some with lower and some with higher variances than the average predicted variance. Note that a sum of two or more normal distributions is not normal and that this effect cannot be accounted for by some adjustment to the average predicted variance.

The sum of normal distributions is expressed as follows:

$$F(t) = \sum_k \frac{\alpha_j}{\sqrt{2\pi} \cdot \sigma_k(t)} \cdot \exp\left[-\frac{(x - x_m)^2}{2\sigma_k^2(t)}\right] \quad (10)$$

where weights $\alpha_j$ must be such that $$\sum_k \alpha_j = 1 \quad (11)$$

Weights $\alpha_j$ and variances $\sigma_k(t)$ can be estimated from historical data using nonlinear regression analysis with constraint (11).

The probability of executing a limit order can be derived similarly to the case of the normal distribution. The final result is as follows:

$$P_e(t) = \sum_k \alpha_k \cdot \text{erfc}\left(\frac{(x_l - x_m)}{\sqrt{2} \cdot \sigma^2(t)}\right) \quad (12)$$

Data-Driven Distribution Functions

In another implementation of the algorithm, one bypasses the use of short time interval, e.g. 1-minute, variances and does not use the normal distribution for price changes over the time of the limit order. Instead, one uses historical data to estimate the distribution over the time of the limit order.

The distribution of price changes can be estimated specifically for the security of interest using historical data. The distribution function is represented in a computer program as a histogram. Historical data are scanned for some preset period of time (e.g., 3 years) and changes in the stock price are tallied into the histogram. Alternatively, the distribution function is represented as an expansion over any basis (such as weighted orthogonal polynomials); in this case changes in the stock price are used to update the expansion coefficients.

The data series should be long enough to make results statistically robust, yet short enough to minimize bias in the data if there were significant events in the series, which have changed statistical features of stock price distributions (such as bankruptcies, significant mergers and acquisitions, etc.). Stock price data should be adjusted for splits in the data series.

One can consider the duration of the data series as a time window that is used to estimate the data-driven distribution. The older data items in this time window may have less relevance than the newest data items due to continuous changes in company finances, stock trading volume, the market as a whole, etc. One can estimate the probability distribution by tallying weighted histograms, with weights for most recent data items being higher than those for older data items.

If the data-driven distribution function F(x,t) for stock price variations is estimated, then we can compute the distribution function $F_{ne}(x,t)$ for the price of the stock under the assumption that the order has not executed during the time period of the validity of the limit order (assumed to be during the day of order placement). This is given by (see (4))

$$F_{ne}(x, t) = \begin{cases} F(x, t) - F(2x_l - x_m - x, t) & \text{if } x < x_l \\ 0, & \text{if } x \geq x_l \end{cases} \quad (13)$$

where F(x,t) is (as above) the distribution function for the stock price estimated at time t from data-driven distribution function of stock price variations and market price at the time of order placement $x_m$.

Probability that the order is executed during the time of its validity is given by:

$$P_0 = 1 - \int_{-\infty}^{+\infty} F_{ne}(p, t_{eod}) \cdot dp \quad (14)$$

Variability of the Distribution Function

Stock prices are affected by a variety of factors. Some of these factors can be viewed as parameters in the distribution function for stock price changes. To make our estimates of the distribution function more accurate, we parameterize the distribution function to account for certain factors which affect it. This section describes these improvements.

Variability as a Function of the Time of Day

Practice shows that stock prices often exhibit high variability at the start of the day compared to the end of the day. This is most likely due to arrival of new information and due to changes in investors' sentiment which may have occurred overnight. It is important to account for this effect.

If we use the short time interval, e.g. 1-minute, variance approach, we approximate the value of the 1-minute variance as a function of the time of day. The variance of the resulting normal distribution for stock price change over the time of the limit order is the sum (integral) of 1-minute variances over the time of the limit order. In other words, it is not enough to account just for the duration of the limit order, but it is important to account for the specific time of the order placement and its duration.

If we use a data-driven distribution function, then we must parameterize it for the time of the limit order placement and duration. In practice, it is sufficient to tally multiple distribution functions from historical data, with each starting at different times of the day (e.g., every half hour) and lasting for some specific time (e.g., half hour). This produces a set of distribution functions $F(x,t_s,t_e)$, where multiple time values $t_s$, $t_e$ denote the start and the end of the time interval for each distribution function; these time values differentiate distribution functions in the set. For limit orders placed at some time $t_0$, which does not coincide with any of the start times $t_s$, the desired distribution function can be approximated from the set using interpolation or other estimation techniques. Distribution functions for longer durations can be estimated from the original set by applying convolution. This assumes that stock price changes for non-overlapping day time periods are not correlated, which is a good approximation.

Event-Driven Variability

Estimating the probability of executing a limit order invariably involves extrapolating past information into the future. While our method does not attempt to predict specific stock prices, it makes certain assumptions about statistical properties of stock price behavior. In particular, we assume that there is some degree of stability in the probability distribution function for stock price variation.

In practice, stock price variability changes from one day to another. This is not a fully random process (otherwise it would be accounted for by the probability distribution function itself). Thus, assumption of the stability of the distribution function is an approximation. This approximation leads to inaccuracies in the estimates for the probability of limit order execution. These inaccuracies can be mitigated by using external information, which can affect the stock prices in a special way.

There may be valid reasons to assume that stock price variability during the time of validity of a limit order may be different from the average value. Examples of such special situations include (but are not limited to) the following: scheduled earnings releases, earning releases from major competitors, major announcements, which applicable to the market as a whole, e.g. Federal Reserve decisions on rates, etc. We call this increase in the stock price variability the event-driven variability.

We may analyze historical data to estimate a relative increase in the variance of stock price, which can be attributed to the event-driven variability. Historical data on a given stock may not have enough events to estimate the event driven variability. Thus, it may be necessary to estimate the relative increase in price variance for many stocks in the market (e.g., for Russel 3000 stocks, or for all stocks in a given sector of economy) for each class of scheduled announcements or other expected events. We denote the relative increase in the standard deviation of the stock price variability for a particular event by θ. This quantity is defined as follows:

$$\theta(t) = \frac{\sigma_{ev}(t)}{\sigma_{nev}(t)} \quad (15)$$

where $\sigma_{ev}(t)$ is the standard deviation in the stock price over time period t when similar events have occurred, and $\sigma_{nev}(t)$ is the standard deviation in the stock price over time period t when similar events have not occurred. Both $\sigma_{ev}(t)$ and $\sigma_{nev}(t)$ are derived from historical data.

If a particular event is expected during the validity time of the limit order (e.g., earnings release is scheduled for the next day), then the average probability distribution function can be scaled in such a way that it reflects the increased variability, which is typically associated with that kind of event.

This is achieved by scaling the probability distribution F(x,t) in the following way: in place of F(x,t) we use $$F\left(\frac{x}{\theta(t)}, t\right)$$

in all equations.

Limit Orders which are Valid Beyond the Day of their Placement

If the duration of the limit order is such that the order can be executed on the next day or further into the future, one must account for the overnight stock price variability. Data shows that stock prices may change substantially overnight, and one can estimate an empirical probability distribution function for such price change using historical data. Note that the assumption of normality is not valid for this distribution function. Thus the most reliable and accurate model for distribution of overnight price changes is from the data.

The mathematical model for the probability of executing limit orders can be extended to multiple-day limit orders as follows:

We compute the distribution function $F_{ne}(x, t_{eod})$ for the price of the stock under the assumption that the order has not executed during the current day (current day is defined as the day of the placement of the limit order). This is given by (see (4))

$$F_{ne}(x, t_{eod}) = \begin{cases} F(x, t_{eod}) - F(2x_l - x, t_{eod}), & \text{if } x < x_l \\ 0, & \text{if } x \geq x_l \end{cases} \quad (16)$$

where $F(x, t_{eod})$ is the distribution function for the stock price computed at the end of day $t = t_{eod}$.

Probability that the order is executed during the current day is given by:

$$P_0 = 1 - \int_{-\infty}^{+\infty} F_{ne}(x, t_{eod}) \cdot dx \quad (17)$$

We estimate a distribution function for overnight price changes $F_{on}(x)$ from historical data. The distribution of price changes can be estimated specifically for the security of interest using historical data. The distribution function is represented in a computer program as a histogram. Historical data are scanned for some preset period of time (e.g., 3 years) and changes in the stock price are tallied into the histogram. Alternatively, the distribution function is represented as an expansion over any basis (such as weighted orthogonal polynomials); in this case changes in the stock price are used to update the expansion coefficients.

The distribution function of the stock price at the opening on the next day is now computed as $$F_{ne}(x, t_{eod}) * F_{on}(x), \quad (18)$$

where * denotes convolution.

The probability of selling the stock at the opening on the next day is computed as $$P_{op1} = \int_{p_l}^{\infty} F_{ne}(x, t_{eod}) * F_{on}(x) \cdot dx \quad (19)$$

The distribution function immediately after the opening under condition that the order has not been executed is defined by:

$$F(x, t_1) = \begin{cases} F_{ne}(x, t_{eod}) * F_{on}(x), & \text{if } x < x_l \\ 0, & \text{if } x \geq x_l \end{cases} \quad (20)$$

where subscript 1 refers to the next day.

The distribution function of the stock price during the next day under condition that it has not been sold at the opening is computed as convolution $$F(x, t_{eod1}) = F(x, t_{eod}) * F(x, t_1) \quad (21)$$

The distribution function for stock prices at the end of the next day under condition that the limit order has not been executed is given by $$F_{ne}(x, t_{eod1}) = \begin{cases} F(x, t_{eod1}) - F(2x_l - x, t_{eod1}), & \text{if } x < x_l \\ 0, & \text{if } x \geq x_l \end{cases} \quad (22)$$

The probability that the limit order is executed during the next day is as follows:

$$P_1 = 1 - \int_{-\infty}^{+\infty} F_{ne}(x, t_{eod1}) \cdot dx \quad (23)$$

Finally, the probability that the limit order is executed any time during the current day or the next day is as follows:

$$P_2 = P_0 + P_{op1} + P_1 \quad (24)$$

This procedure can be repeated to compute the probability of executing limit orders, which are valid for multiple days.

Mathematical Formulation for Low Volume Stocks

The mathematical formulation presented above is predicated on small elementary changes in the price of the stock. Many successive small price changes produce a Brownian motion type of price movement. This enables us to compute the distribution function for the stock price under the condition that the limit order has not been executed (see equation (4)), which in turn enables us to compute probabilities of order execution.

While this assumption may be quite accurate for highly liquid stocks, it is less accurate for stocks of smaller companies that often trade with lower volume. For the latter category of stocks, price may change by a larger amount at each trade, but the number of trades is smaller. We will refer to this case as the finite price changes (as compared to the approximation of infinitesimal price changes for highly liquid stock). The algorithm for estimating the probability of executing a limit order must be modified to account for this case.

Let us look at the primary qualitative effect of finite price changes. The limit trade order is executed when the price is equal or exceeds the target sale price. If the market price varies by some finite amounts at each trade, then it is possible that the target sale price will be never hit exactly, and the order will be executed at the price that is higher than the sale price. One can compare this to the case of infinitesimal price changes, when the market price changes by such a small amount at each trade (e.g., by at most 1 cent) that an order executes at exactly the target price or does not execute at all.

Thus, the net effect of finite price changes is that the actual sale price may be somewhat higher than the target price set by the limit order (we will refer to the latter as the true target price). This affects our computation for the probability of executing a limit order. A method to account for this phenomenon follows, with all mathematical formulation intact, but instead of the true target order price we use an effective order target price. The effective order target price is obtained by adding a correction to the true order target price. A means to compute such correction are presented below.

A Model for Correction to the Sales Price

From the discussion above, it is clear that the difference between the effective target price and the true target price depends on the magnitude of price changes at each trade. Thus, the value of the correction C to the true target price is a function of the standard deviation $\sigma_t$ of individual price changes at each trade:

$$C=\Psi(\sigma_t) \quad (25)$$

We know that if individual price changes at each trade are infinitesimally small, then the effective target price is equal to the true target price (no correction is necessary). Thus, if we expand function $\Psi(\sigma_t)$ in a Taylor series at zero, the zero-order term vanishes. This leads to the following approximate model:

$$C=\mu \cdot \sigma_t \quad (26)$$

where $\mu$ is a constant coefficient, which can be estimated from historical data. Based on some preliminary simulations, the value of $\mu$ can be set to 0.59 (additional research may modify the estimate for $\mu$).

The probability of limit order execution is now computed using any previous formulation (e.g., one of the following equations: (7), (9), (12), (13-14), (16-24)) where $x_I$ is replaced by $x'_I$ $$x'_I = x_I + \mu \cdot \sigma_t \quad (27)$$

Parameterization of the Coefficient

In one embodiment of the present invention, the accuracy of the Taylor expansion (26) is improved may be improved by processing historical data. Specifically, the value of coefficient $\mu$ does not have to be uniform, and one may want to parameterize it to model the effects of finite price changes better. For example, we can assume that $\mu$ is a function of the average trading volume for the stock and the duration of the limit order:

$$\mu=\mu(V,t) \quad (28)$$

One can run an analysis of historical data and simulate placing multiple trades with different values of correction C. From such analysis, one can fit function (28) to the simulated sale data using regression or a similar technique.

Then the probability of the limit order is computed as in the section describing the model for correction to the sales price, but with values of $\mu$ defined by function (28).

Diagrams of the Invention Embodiments

Referring now to FIG. 1, a schematic diagram of an embodiment of the present invention is presented. Computer system 11 is connected to a database of historical stock prices either through the Internet (as in FIG. 1), directly, or houses such database locally. When a user intends to place a limit trade on a stock, she enters typical information, such as the ticker symbol, number of shares, and desired limit price.

Figure 2:
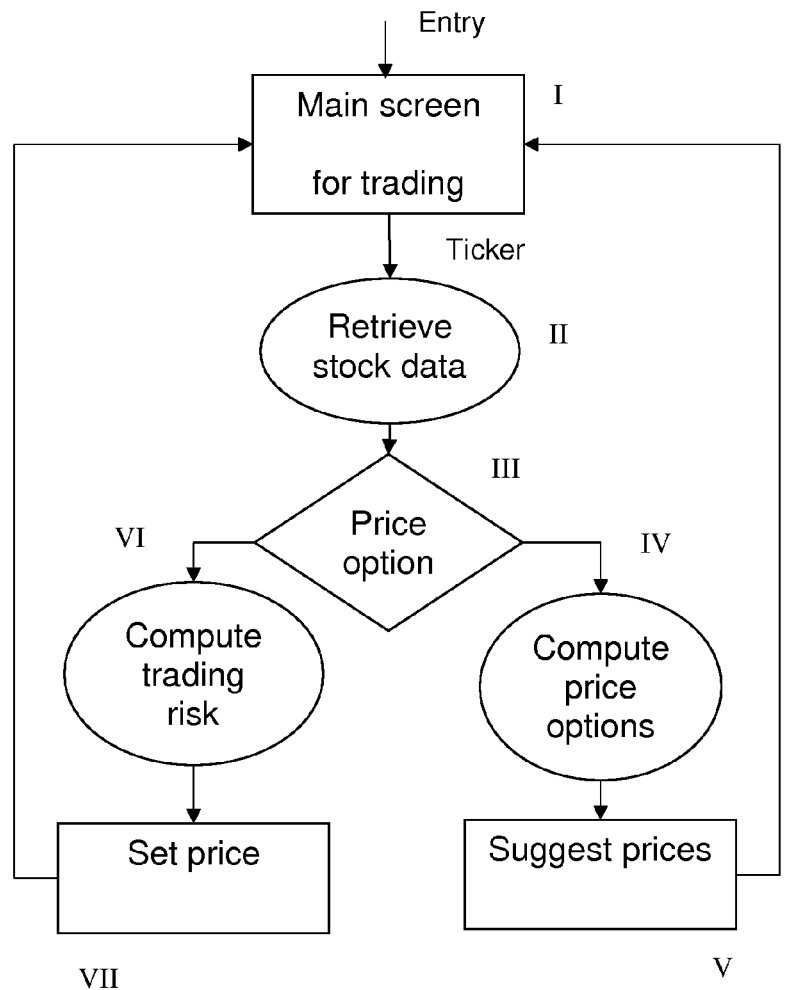
FIG. 2 represents a schematic diagram of an embodiment of the present invention.

The computer system houses and executes an algorithm to compute risk of not executing the desired trade within a given timeframe and/or to assist the user with the limit price selection. A block diagram of this algorithm is shown in FIG. 2. FIG. 2 describes an algorithm which is housed by the computer system shown in FIG. 1 and thus is an expansion of a part of element 11 of FIG. 1.

Referring now to FIG. 2, an embodiment of the present invention is further illustrated by a block diagram. In the step (I) the security ticker is entered into the main screen for trading, followed by (II) retrieving of the security historical and current data. In the step (III) a decision is made to compute (IV) prices for several pre-set order execution probabilities or alternatively to compute (VI) the trading risk, which is the probability of executing a limit order at a pre-set price. In the step (V) the suggested prices for several pre-set order execution probabilities are provided as output. In the step (VII) the trading risk, or the probability of executing a limit order at a pre-set price is provided as output.

Figure 3:
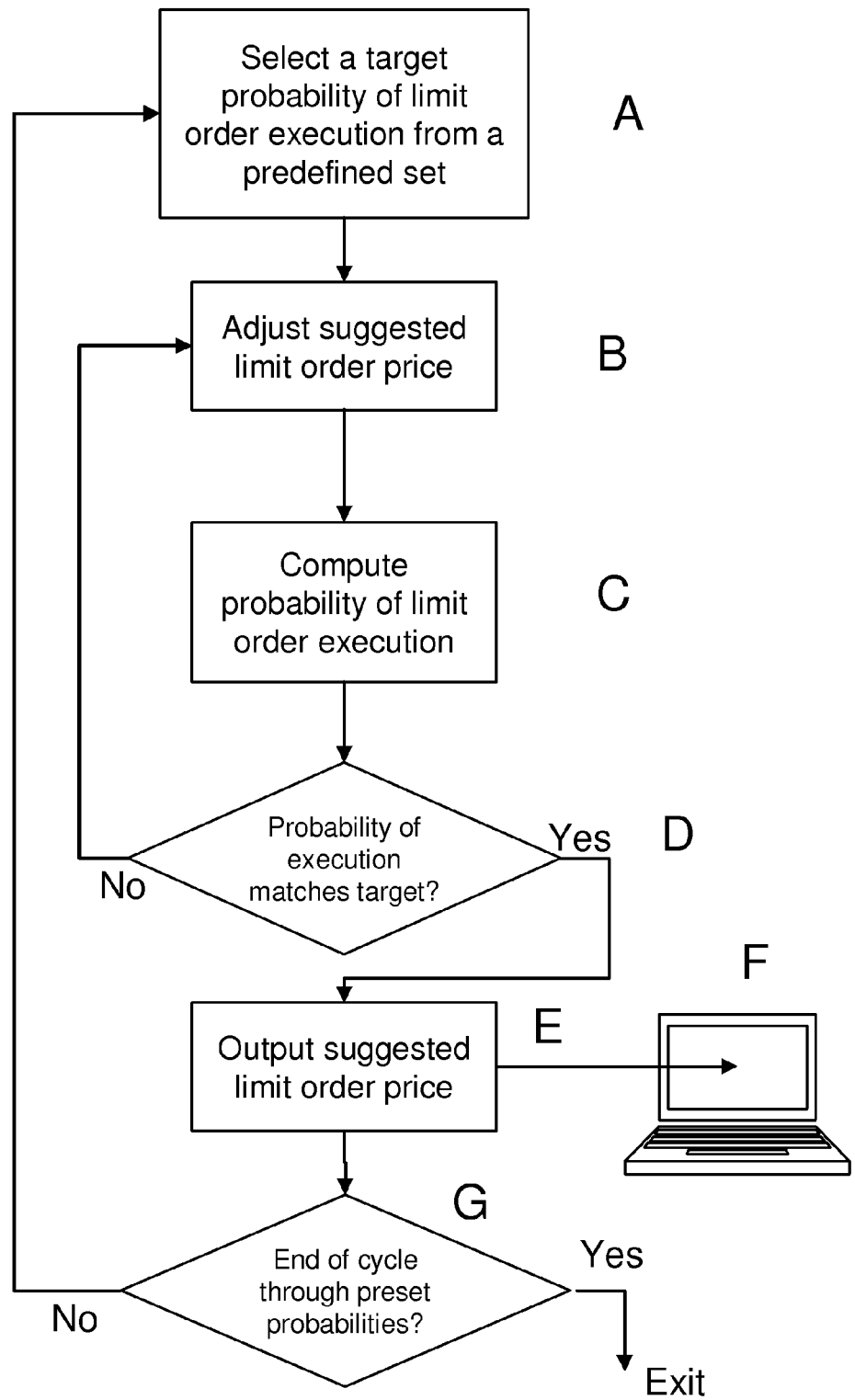
FIG. 3 represents a detailed block-diagram of an embodiment of the present invention for suggesting limit order prices.

Referring now to FIG. 3, a block diagram of an embodiment of the present invention is shown in more detail illustrating the process of suggesting limit order prices based on probability of limit order execution. FIG. 3 is further illustrating the steps I, II, III, IV, and V of FIG. 2. Moving along the diagram in FIG. 3 from the top down, after (a) selecting a target probability of limit order execution form an optionally pre-defined set, and (b) optionally adjusting the suggested limit order price, the probability of limit order execution is (c) computed. The probability is then (d) compared vs. the target, and if the probability matches the target, the suggested limit order price is (e) outputted and (f) presented to the trader on a computer screen. The process is repeated (g) until all preset probabilities were cycled through and corresponding suggested limit order prices were computed and provided as an output to the trader. If in the step (d) the probability does not match the target, the suggested limit order price is adjusted in the step (b) and whole cycle comprising steps (c) through (g) is repeated.

Figure 4:
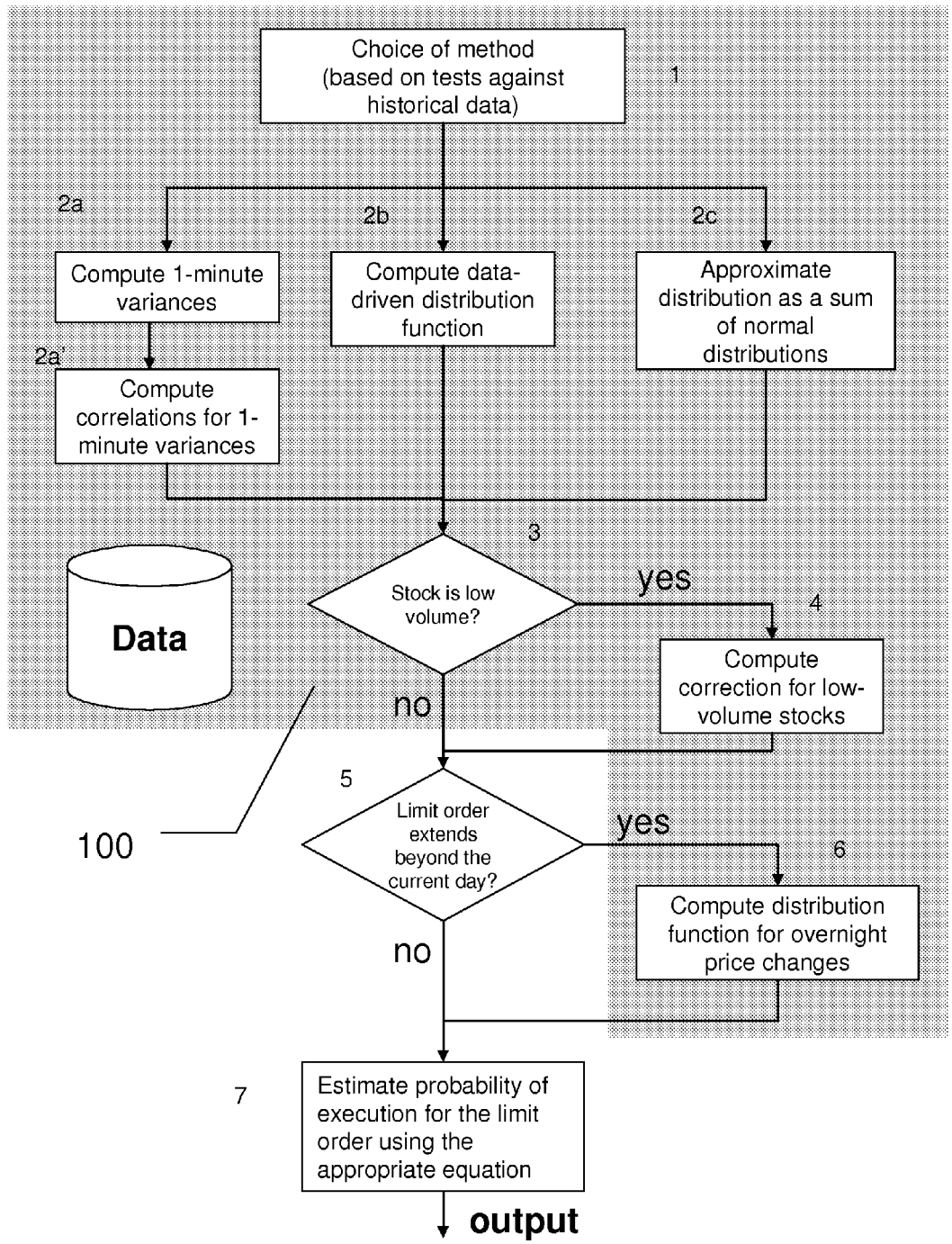
FIG. 4 represents a detailed block diagram of an embodiment of the present invention for computing the probability of limit order execution.

Referring now to FIG. 4, a detailed block diagram is shown illustrating an embodiment of the present invention for computing the probability of limit order execution, corresponding to step (c) of the process of FIG. 3. All items in the shaded area 100 of the block diagram in FIG. 4 require access and make use of historical stock data. The computation of the probability of limit order execution comprises the step (1) of choosing the method of computation, based on tests against historical data, followed by one or more of computations steps (2a-2a'), Computing short time interval, for instance 1 minute, variances and correlations for short time interval, for instance 1 minute variances; (2b), Computing data-driven distribution function; and (2c), computing approximate distribution as a sum of normal distributions. At least one of the computing steps (2) is used, but any combination of two computing steps or all three computing steps can also be employed. In the step (3), the determination is made whether the stock or security is a low trading volume security. For low trading volume securities, in the step (4) a correction for low volume securities is computed. In the step (5) the an estimation is made whether the limit order extends beyond the current day, in which case in step (6) a distribution function for overnight price changes is computed.

The results of calculations in steps 2a-2a'; 2b; and 2c, with optional corrections of steps (4) and (6) are then used to estimate the probability of executing the limit order using appropriate equations corresponding to computation steps 2a-2a'; 2b; and 2c. The resulting probabilities are then provided as outputs of step (c) and inputs into step (d) of FIG. 3.

Uses of the Invention Embodiments

This section describes several ways that embodiment of the invention can be used to assist investors in researching stocks and in placing limit orders.

Integration with Stock Order Placement Menus

Many brokerages provide software applications for investors to place orders for buying and selling stocks. These software applications may be stand-alone applications installed locally on an investor's computer, or they may be enterprise applications that run on company computer systems and are accessed by investors through Internet web browsers. In either case, these applications generally provide a menu page for placing stock orders. A typical order placement menu requires the user to specify 1) the desired stock ticker symbol, 2) whether the order will be a buy or sell, and 3) whether the order is a market or limit order. If the order type is a limit order, the menu also requires the investor to enter the limit order price and the duration of the order (e.g., until end of day, good until cancelled, etc.).

Figure 5:
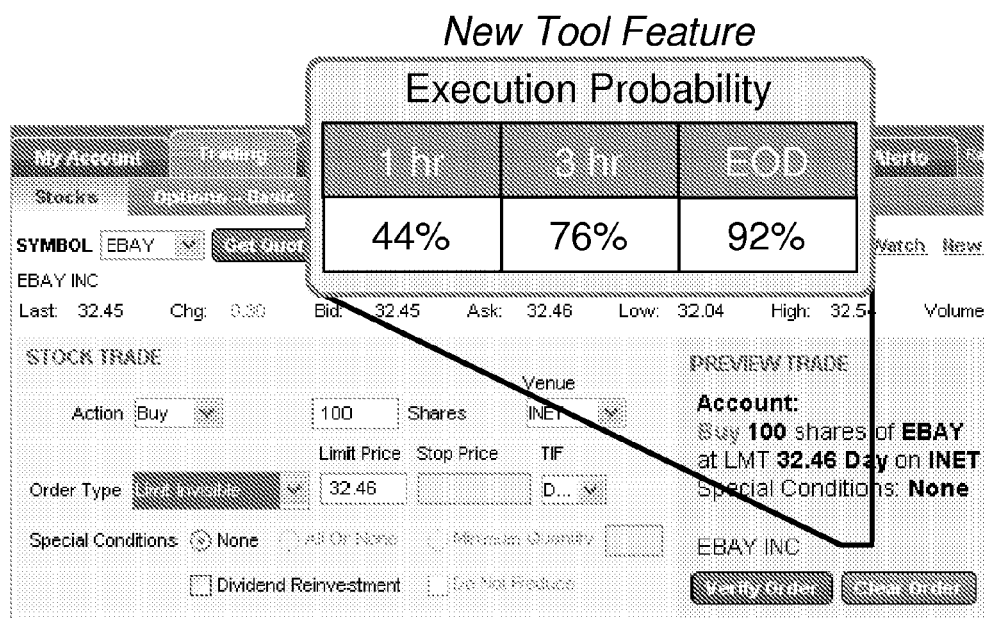
FIG. 5 represents a simulated screen output within trading software application of limit order placement menu with limit orders execution probabilities as a function of time.

The results generated by an embodiment of the present invention can be directly integrated into a brokerage's limit order placement menu in several ways. Referring now to FIG. 5, we represent an example of how the probability of execution for several time periods, including by "end of day" (EOD) for the user-specified price can be integrated directly into a limit order placement menu and is previewed before placing the final order.

Figure 6:
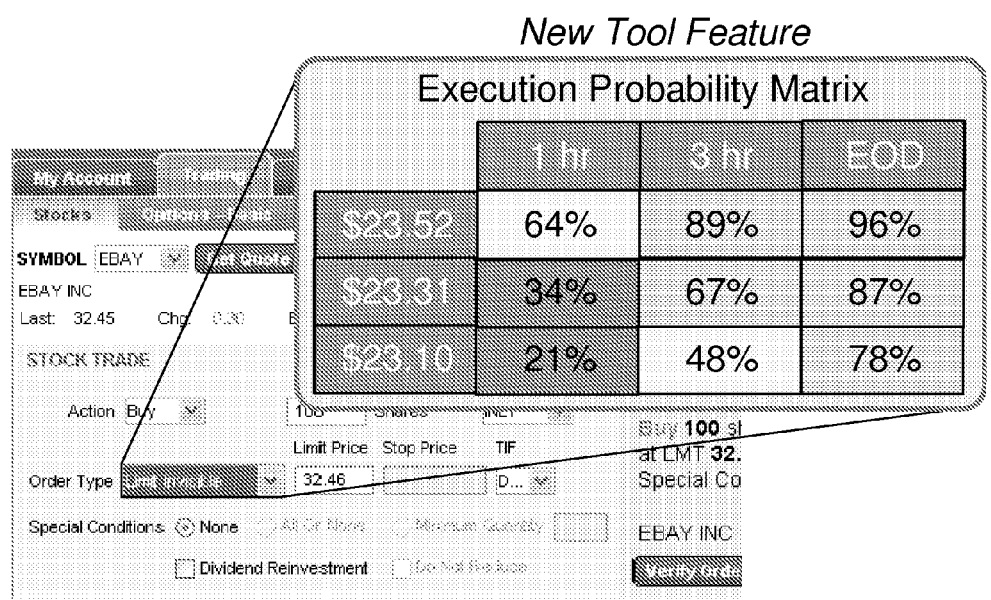
FIG. 6 represents a simulated screen output within trading software application of a matrix of estimated limit orders execution probabilities integrated into limit order placement menu.

Referring now to FIG. 6, the figure represents an example of how the probability of execution for a range of time periods and prices can be generated to assist the investor in choosing the desired limit order price. The number of time periods and number of prices displayed in the matrix is unlimited, and could also be displayed graphically.

Figure 7:
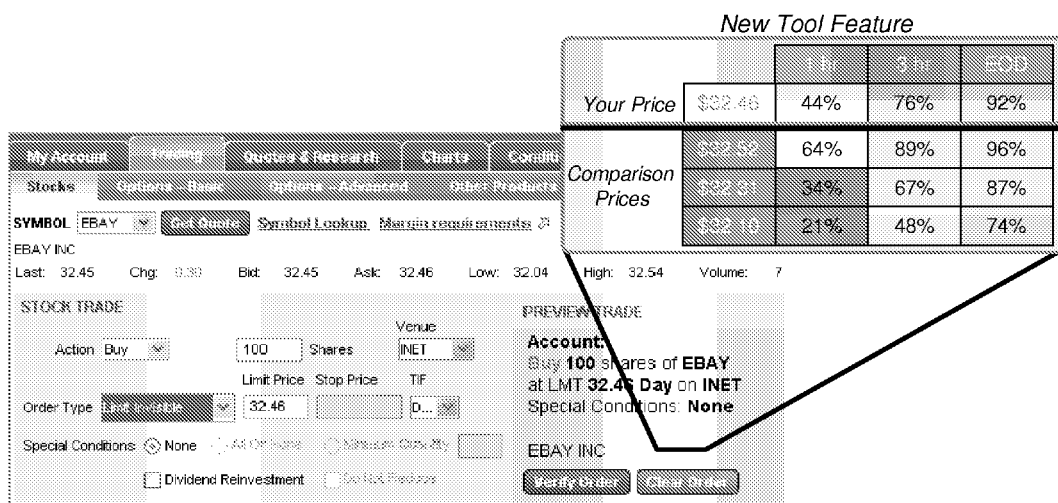
FIG. 7 represents a simulated screen output within trading software application showing integration of both specified price and matrix of other prices into limit order placement menu.

Referring now to FIG. 7, the figure shows a combination of the previous two examples, where the probability of execution for the chosen price and a range of comparison prices are displayed over several time periods. Given the estimated probabilities of execution, the investor may then decide to adjust the value of the order prior to submitting it.

Stock Monitoring and Alerts

Figure 8:
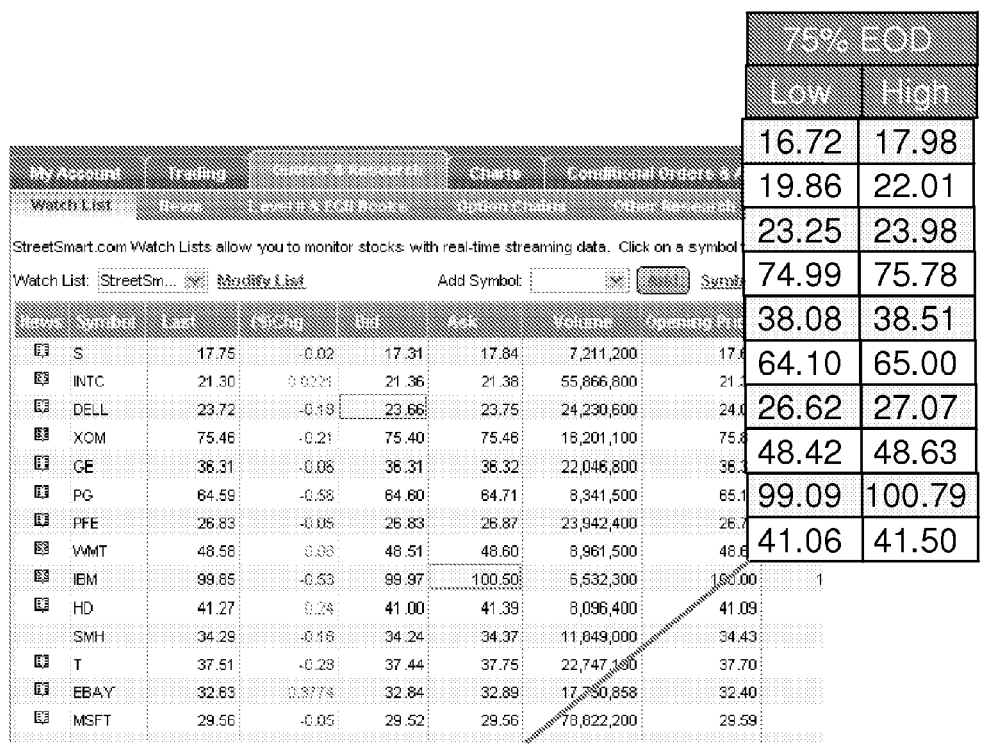
FIG. 8 represents a simulated screen output within a stock watch list software application showing integrated estimated limit order execution probability and corresponding stock prices.

Companies that provide stock monitoring services, including online brokerages as well as stock monitoring Internet web sites such as Google Finance or Yahoo! Finance, typically provide a means to monitor current metrics for stocks of interest. The list of stocks is called a watchlist, and metrics typically include current price, P/E ratio, volume, etc. for each stock on the watchlist. Up-to-date results from the invention can be included in the metrics displayed for the watchlist. As an example, FIG. 8 shows how the prices for a given probability of execution can be displayed for each stock in an investor's watchlist. Shown for each stock is the high (sell) and low (buy) price that has a 75% chance of executing by the end of day (EOD). The investor could configure the probability (75% in this example) as well as the time period to suit his personal preferences.

These companies also typically provide investors with an alert service that sends the investor an email or text message when certain user-specified conditions are met (for example, if the current price reaches a specified value). The invention can be used to provide new alert criteria: if the probability of reaching a user-specified price exceeds a user-specified value, then the investor is alerted. For example, an investor may request a text message be sent to his phone if the probability of a stock's price reaching $100 within 4 hours is greater than 90%.

Marketing Investment Products Based on Investor Limit Order Risk Preferences

A brokerage company may monitor, on a non-interfering basis, limit orders placed by an investor and use the invention to determine how aggressive or conservative the investor is. For example, an aggressive investor may place limit orders with consistently lower probabilities of execution, whereas a conservative investor may place limit orders with consistently higher probabilities of execution. Knowing an investors risk behavior, a company may provide information that is customized to the investor, including new product recommendations and educational material, as well as a personalized user experience with the company's trading application.

Calculation Examples

Figure 9:
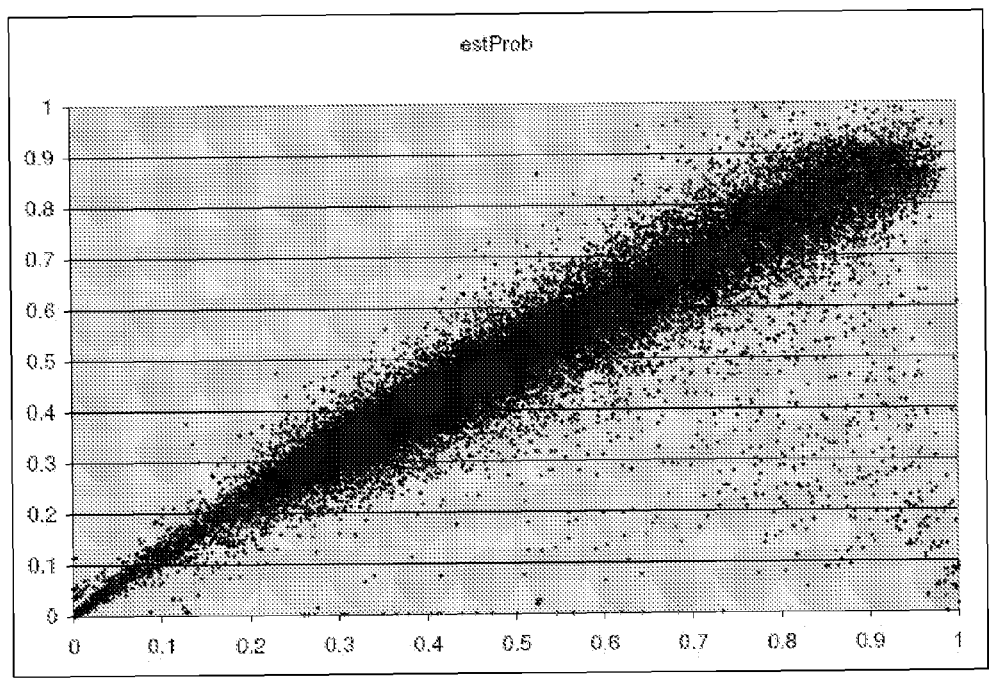
FIG. 9 represents a scatter plot comparing calculated probability of executing a limit price order vs. empirical historical probability of executing a limit price order.
Figure 10:
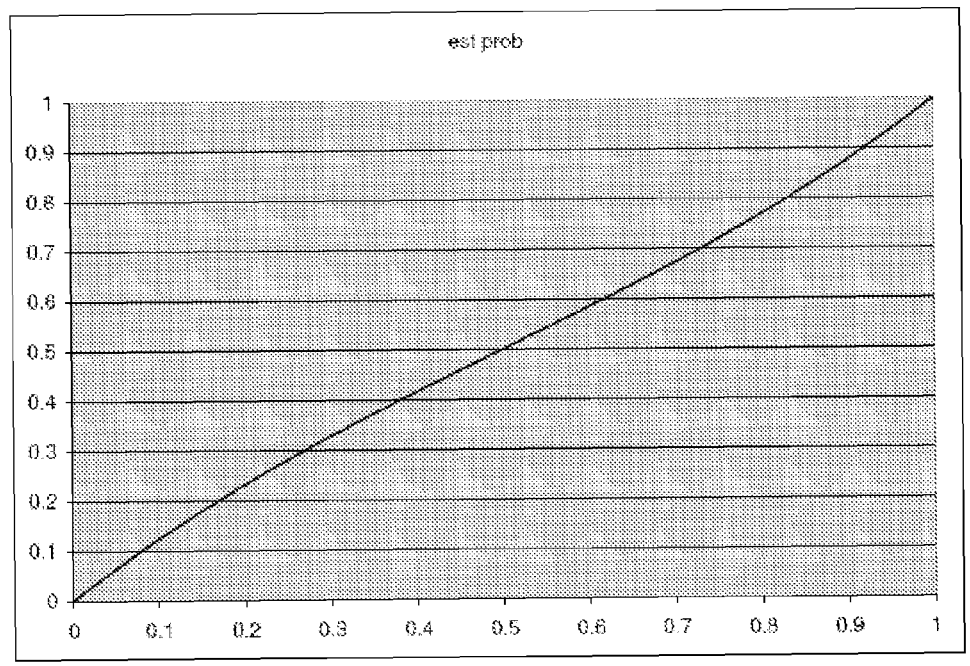
FIG. 10 represents a regression of the data presented in FIG. 9.

FIG. 9 represents a scatter plot comparing calculated probability of executing a limit price order vs. empirical historical probability of executing a limit price order. FIG. 10 represents a regression of the data presented in FIG. 9. For both plots, the vertical axis is the estimate of the probability as calculated using an embodiment of the present invention, and the horizontal axis is the empirical probability i.e., number of sales over the number of orders. About 27 million orders were used to plot the scatter plot of FIG. 9. Some of the scattered points, where the empirical probability is large and the probability estimate is low, in the lower right corner of the plot, mostly due to companies which went bankrupt or otherwise stopped trading. The regression plot in FIG. 10 illustrates the accuracy of the predicted probability of the order execution.

We claim:

1. A system for estimating a probability of executing a limit price order of at least one security at an execution price, comprising:
   one or more computer processors configured to receive input identifying the security and the execution price;
   said one or more computer processors configured to receive and process data regarding historical market prices of the security;
   said one or more computer processors configured to calculate the probability of executing the limit price order of the security at the execution price within a time period; and
   an electronic display component, in communication with said one or more computer processors, configured to display the probability of executing the limit price order within the time period,
   wherein the probability of executing the limit price order is estimated by using at least one probability function,
   wherein the probability function is a normal distribution function $$P_e(t) = \mathrm{erfc}\left(\frac{(x_l - x_m) \cdot \sqrt{\Delta t}}{\sqrt{2t} \cdot \sigma_s}\right);$$

a covariance corrected normal distribution function $$P_e(t) = \mathrm{erfc}\left(\frac{(x_l - x_m) \cdot \sqrt{\Delta t}}{\sqrt{2t} \cdot (\sigma_s + 2\zeta)}\right);$$

or a variance corrected normal distribution function $$P_e(t) = \sum_k \alpha_k \cdot \mathrm{erfc}\left(\frac{(x_l - x_m)}{\sqrt{2t} \cdot \sigma_k(t)}\right).$$

2. A system of claim 1, wherein said security is a stock, a commodity, a unit of currency, or a futures contract.

3. A system of claim 2, wherein said one or more computer processors is further configured to calculate a plurality of probabilities of executing the limit price order at a corresponding plurality of execution prices within a plurality of time periods.

4. A system of claim 3, wherein the probability of executing the limit price order is estimated by a computational method selected from the group consisting of
   computing short time interval variances with correlations to short time interval variances;

computing data-driven distribution functions;
computing approximate distribution as a sum of normal distributions;
and combinations thereof.

5. A system of claim 4, wherein for a low trading volume security the probability of executing the limit price order is corrected by computing a correction for low trading volume securities.

6. A system of claim 5, wherein for the limit price order extending beyond a current day, the probability of executing the limit price order is corrected by computing a distribution function for overnight price changes.

7. A system of claim 6, wherein the probability of executing the limit price order within the time period is displayed within a security trading application.

8. A system of claim 7, wherein the probability of executing the limit price order within the time period is displayed in a security watch list and is communicated to an investor as an alert.

9. A system of claim 8, wherein a provider of the security trading application monitors the limit price orders placed by the investor;
determines a risk tolerance of the investor from the probability of executing the limit price orders placed by the investor;
provides information and services customized to the investor based on the risk tolerance of the investor.

10. A system for estimating a suggested price of a limit price order for at least one security, comprising:
one or more computer processors configured to receive input identifying the security and at least one preset probability of executing of the limit price order;
said one or more computer processors configured to receive and process data regarding historical market prices of the security;
said one or more computer processors configured to
establishing a range of suggested prices;
calculate the probability of executing the limit price order of the security at at least one suggested price within a time period,
compare the probability of executing the limit price order with at least one preset probability;
repeat calculations until the probability of executing the limit price order at the suggested price matches at least one preset probability thus estimating the suggested price at the preset probability of executing the limit price order;
an electronic display component, in communication with said one or more computer processors, configured to display the suggested price at the preset probability of executing the limit price order,
wherein the probability of executing the limit price order is estimated by using at least one probability function,
wherein the probability function is a normal distribution function $$P_e(t) = \mathrm{erfc}\left(\frac{(x_l - x_m) \cdot \sqrt{\Delta t}}{\sqrt{2t} \cdot \sigma_s}\right);$$

a covariance corrected normal distribution function $$P_e(t) = \mathrm{erfc}\left(\frac{(x_l - x_m) \cdot \sqrt{\Delta t}}{\sqrt{2t} \cdot (\sigma_s + 2\zeta)}\right);$$

or a variance corrected normal distribution function $$P_e(t) = \sum_k \alpha_k \cdot \mathrm{erfc}\left(\frac{(x_l - x_m)}{\sqrt{2t} \cdot \sigma_k(t)}\right).$$

11. A system of claim 10, wherein said security is a stock, a commodity, a unit of currency, or a futures contract.

12. A system of claim 11, wherein said one or more computer processors is further configured to calculate a plurality of the suggested prices at a plurality of the preset probabilities of executing the limit price order within a plurality of time periods.

13. A system of claim 12, wherein the probability of executing the limit price order is estimated by a computational method selected from the group consisting of
computing short time interval variances with correlations to short time interval variances;
computing data-driven distribution functions;
computing approximate distribution as a sum of normal distributions;
and combinations thereof.

14. A system of claim 13, wherein for a low trading volume security the probability of executing the limit price order is corrected by computing a correction for low trading volume securities.

15. A system of claim 14, wherein for the limit price order extending beyond a current day, the probability of executing the limit price order is corrected by computing a distribution function for overnight price changes.

16. A system of claim 15, wherein the suggested price at the preset probability of executing the limit price order within the time period is displayed within a security trading application.

17. A system of claim 16, wherein the suggested price at the preset probability of executing the limit price order within the time period is displayed in a security watch list and is communicated to an investor as an alert.

18. A system of claim 17, wherein a provider of the security trading application monitors the limit price orders placed by the investor;
determines a risk tolerance of the investor from the probability of executing the limit price orders placed by the investor;
provides information and services customized to the investor based on the risk tolerance of the investor.

19. A computer implemented method for estimating a probability of executing a limit price order of at least one security at an execution price, comprising the steps of:
using one or more computer processors receiving input identifying the security and the execution price;
using said one or more computer processors receiving and processing data regarding historical market prices of the security;
using said one or more computer processors calculating the probability of executing the limit price order of the security at the execution price within a time period by using at least one probability function; and using an electronic display component, in communication with said one or more computer processors, displaying the probability of executing the limit price order within the time period, wherein the probability function is a normal distribution function a covariance corrected normal distribution function or a variance corrected normal distribution function.

20. A method of claim 19, wherein said security is a stock, a commodity, a unit of currency, or a futures contract.

21. A method of claim 20, further comprising the step of using said one or more computer processors calculating a plurality of probabilities of executing the limit price order at a corresponding plurality of execution prices within a plurality of time periods.

22. A method of claim 21, wherein the step of using said one or more computer processors calculating the probability of executing the limit price order of the security at the execution price within a time period further comprises the step selected from the group consisting of using said one or more computer processors computing short time interval variances with correlations to short time interval variances;

using said one or more computer processors computing data-driven distribution functions;

using said one or more computer processors computing approximate distribution as a sum of normal distributions; and combinations thereof.

23. A method of claim 22, further comprising the step of using said one or more computer processors correcting the probability of executing the limit price order for a low trading volume security.

24. A method of claim 23, which for the limit price order extending beyond a current day further comprises the step of using said one or more computer processors correcting the probability of executing the limit price order by computing a distribution function for overnight price changes.

25. A method of claim 24, further comprising the step using said electronic display component, in communication with said one or more computer processors, of displaying the probability of executing the limit price order within the time period within a security trading application.

26. A method of claim 25, further comprising the steps of using said electronic display component, in communication with said one or more computer processors, displaying the probability of executing the limit price order within the time period in a security watch list and communicating the probability of executing the limit price order to an investor as an alert.

27. A method of claim 26, further comprising the steps of monitoring by a provider of the security trading application of the limit price orders placed by the investor;

determining a risk tolerance of the investor from the probability of executing the limit price orders placed by the investor;

providing information and services customized to the investor based on the risk tolerance of the investor.

28. A method for estimating a suggested price of a limit price order for at least one security, comprising the steps of:

using one or more computer processors receiving input identifying the security and at least one preset probability of executing of the limit price order;

using one or more computer processors, receiving and processing data regarding historical market prices of the security;

establishing a range of suggested prices;

calculating the probability of executing the limit price order of the security at least one suggested price within a time period by using at least one probability function, comparing the probability of executing the limit price order with at least one preset probability;

repeating calculations until the probability of executing the limit price order at the suggested price matches at least one preset probability estimating the suggested price at the preset probability of executing the limit price order;

using an electronic display component, in communication with said one or more computer processors, displaying the suggested price at the preset probability of executing the limit price order;

wherein the probability function is a normal distribution function a covariance corrected normal distribution function or a variance corrected normal distribution function.

29. A method of claim 28, wherein said security is a stock, a commodity, a unit of currency, or a futures contract.

30. A method of claim 29, further comprising the step of using said one or more computer processors calculating a plurality of the suggested prices at a plurality of the preset probabilities of executing the limit price order within a plurality of time periods.

31. A method of claim 30, wherein the step of using said one or more computer processors calculating the probability of executing the limit price order further comprises the step selected from the group consisting of using said one or more computer processors computing short time interval variances with correlations to short time interval variances;

using said one or more computer processors computing data-driven distribution functions;

using said one or more computer processors computing approximate distribution as a sum of normal distributions; and combinations thereof.

32. A method of claim 31, for a low trading volume security further comprising the step of using said one or more computer processors computing a correction for low trading volume securities.

33. A method of claim 32, for the limit price order extending beyond a current day, further comprising the step of using said one or more computer processors correcting by computing a distribution function for overnight price changes.

34. A method of claim 33, further comprising the step of using said electronic display component, in communication with one or more computer processors, displaying within a security trading application of the suggested price at the preset probability of executing the limit price order within the time period.

35. A method of claim 34, further comprising the steps of using said electronic display component, with said one or more computer processors, displaying the suggested price at the preset probability of executing the limit price order within the time period in a security watch list and communicating the suggested price at the preset probability of executing the limit price order within the time period to an investor as an alert.

36. A method of claim 35, further comprising the steps of monitoring of the limit price orders placed by the investor by a provider of the security trading application; determining a risk tolerance of the investor from the probability of executing the limit price orders placed by the investor; providing information and services customized to the investor based on the risk tolerance of the investor.

* * * * *